UNITED STATES PATENT OFFICE.

WILLIAM N. CLARK, OF NEW YORK, N. Y.

IMPROVEMENT IN SOLUBLE COATINGS FOR PILLS.

Specification forming part of Letters Patent No. 209,654, dated November 5, 1878; application filed October 17, 1878.

*To all whom it may concern:*

Be it known that I, WILLIAM N. CLARK, of the city of New York, in the county of New York and State of New York, have invented a new and useful Compound, which I call "Soluble Coating," which compound is fully described in the following specification.

This invention relates to that class of compounds used in coating pills and granules; and it consists in a composition formed by mixing together gum-arabic, gelatine, and hot water.

To prepare the soluble coating, take two parts of good gum-arabic and one part of good gelatine; then add sufficient hot water to mix and melt them together, applying sufficient heat to aid in thoroughly dissolving and mixing the aforesaid articles together, and to make the composition of proper consistence. When so done it is ready to be applied to the pills and granules.

The value of this mixed coating over others in general use is, that no sub-coating of a resinous or other matter is necessary, and is so thin that the pills or granules are not perceptibly increased in size, rendering them easy to be swallowed, and when swallowed the coating readily dissolves in the fluids of the stomach, and brings the mass of the pills or granules in immediate contact with the walls of the stomach. The said coating is entirely sufficient to protect them from atmospheric influences, and effectually covers any nauseous taste or smell. The coating is so transparent as to clearly reveal the color of the mass, and, being durable and firm, is not impaired by age or influence of climate.

I am aware that each of the ingredients separately has been used as a coating for pills; but by their admixture I obtain a result which cannot be obtained by their separate use. I therefore do not claim the ingredients when used alone or with other substances; but

What I claim, and desire to secure by Letters Patent, is—

As a new article of manufacture, pills coated with a fluid gelatinizing transparent compound consisting of gum-arabic and gelatine, in the proportions substantially as set forth.

WM. N. CLARK.

Witnesses:
WM. L. BROWER,
JAMES M. PARKER.